(12) United States Patent
Bennett et al.

(10) Patent No.: US 6,942,352 B2
(45) Date of Patent: Sep. 13, 2005

(54) TRANSFER OPTICS

(75) Inventors: Harold Earl Bennett, Ridgecrest, CA (US); Joseph J. Shaffer, Ridgecrest, CA (US); Robert Carl Romeo, Tucson, AZ (US)

(73) Assignee: Bennett Optical Research, Inc., Ridgecrest, CA (US)

( * ) Notice: Subject to any disclaimer, the term of this patent is extended or adjusted under 35 U.S.C. 154(b) by 94 days.

(21) Appl. No.: 10/639,930

(22) Filed: Aug. 12, 2003

(65) Prior Publication Data

US 2004/0032633 A1 Feb. 19, 2004

Related U.S. Application Data

(60) Provisional application No. 60/403,800, filed on Aug. 15, 2002.

(51) Int. Cl.[7] .............................. G02B 5/08; G02B 7/182
(52) U.S. Cl. ........................................ 359/849; 359/224
(58) Field of Search ................................ 359/223, 224, 359/846, 848, 849, 872, 877; 428/293.4, 912.2

(56) References Cited

U.S. PATENT DOCUMENTS

| | | | | |
|---|---|---|---|---|
| 4,295,710 A | * | 10/1981 | Heinz .......................... | 359/849 |
| 4,657,358 A | * | 4/1987 | Anthony et al. ............. | 359/845 |
| 4,734,557 A | * | 3/1988 | Alfille et al. ............... | 219/121.74 |
| 4,940,318 A | * | 7/1990 | Ealey et al. ................. | 359/849 |
| 5,210,653 A | * | 5/1993 | Schell .......................... | 359/846 |
| 5,357,825 A | * | 10/1994 | Costello et al. ............. | 74/490.07 |
| 2004/0021054 A1 | * | 2/2004 | Bennett ....................... | 250/201.9 |

OTHER PUBLICATIONS

Chen et al, Progress in very lightweight optics using graphite fiber composite materials, Optical Engineering 37(2) 666–676, Feb. 1998.*

H.E. Bennett, J.J.Shaffer, R.C.Romeo. and P.C.Chen, Ground–Based Adaptive Optic Transfer Mirrors for Space Applications: I. Design and Materials, Beamed Energy Propulsion: 2003, American Institute of Physics, First International Symposium on Beamed Energy Propulsion; II. Composite Prototype Mirror, presented at same symposium.

* cited by examiner

*Primary Examiner*—Mark A. Robinson
(74) *Attorney, Agent, or Firm*—Kenneth G. Pritchard

(57) ABSTRACT

A transfer optic mirror thin enough to permit small influence functions for surface changes is made from cynate ester composites. The thin mirror resulting is then shaped by a plurality of piezoelectric actuators connectors to push/pull rods spread evenly over the back surface of the thin mirror a distance determined by the mirror's influence function. The mirror is held by a support with the same coefficient of expansion as the mirror so external heating and cooling does not distort the mirror. The actuators are connected to a computer so each is separately controlled to contour the mirror as desired.

4 Claims, 5 Drawing Sheets

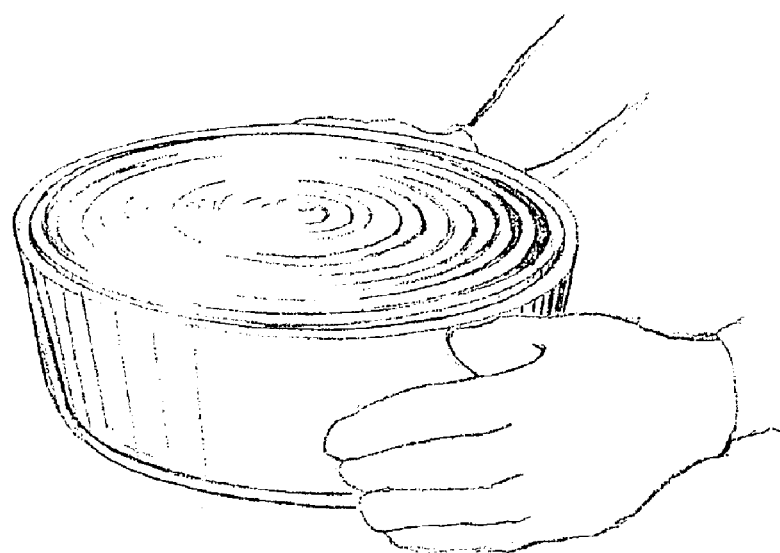
FIG.—7
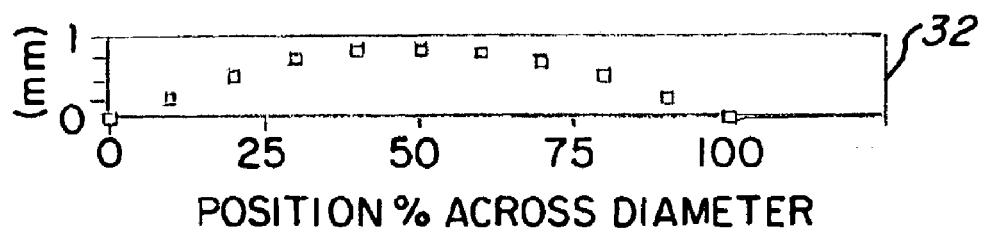
POSITION % ACROSS DIAMETER
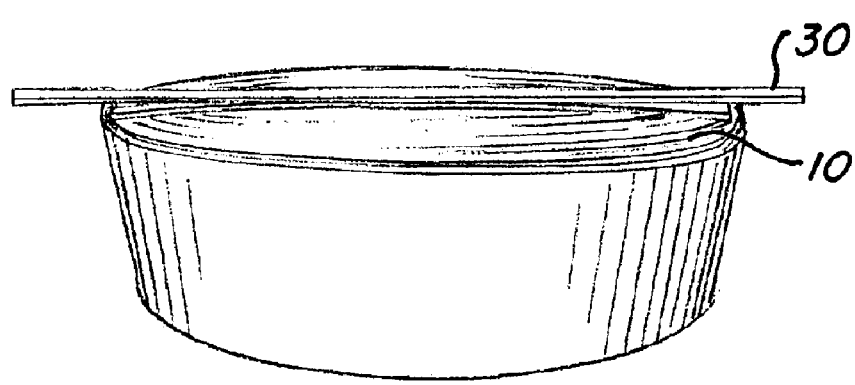
FIG.—8

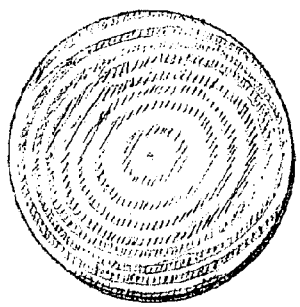
FIG.—9
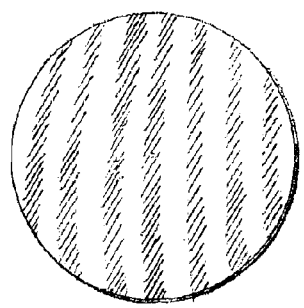
FIG.—10
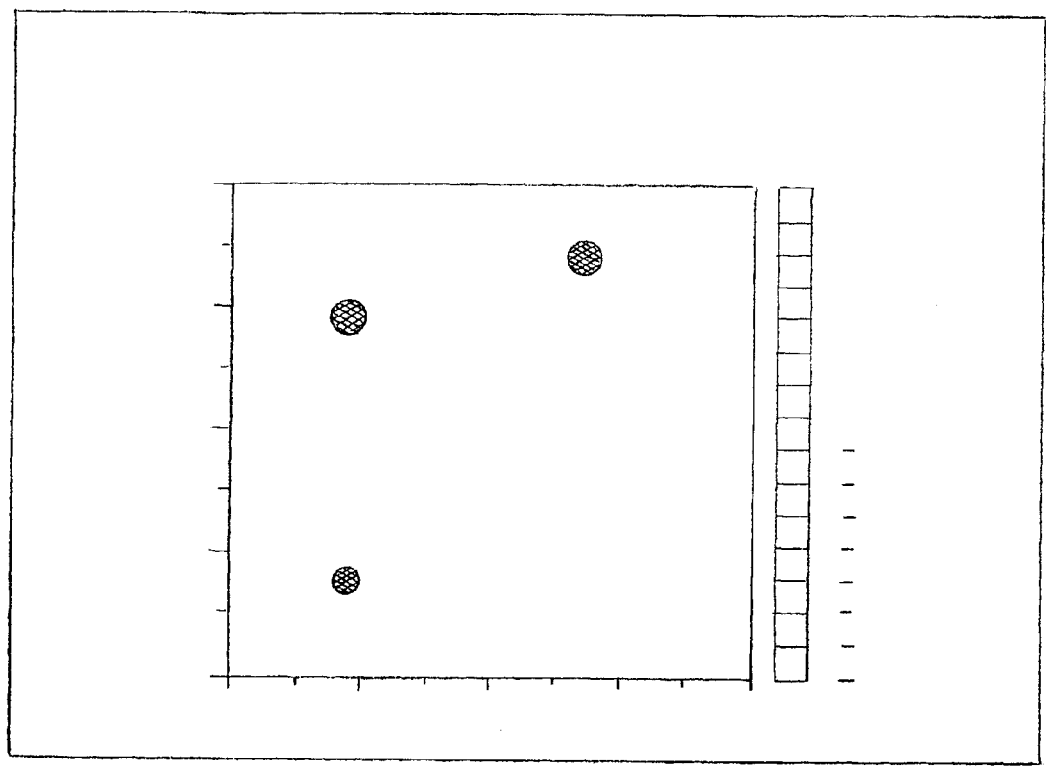
FIG.—11

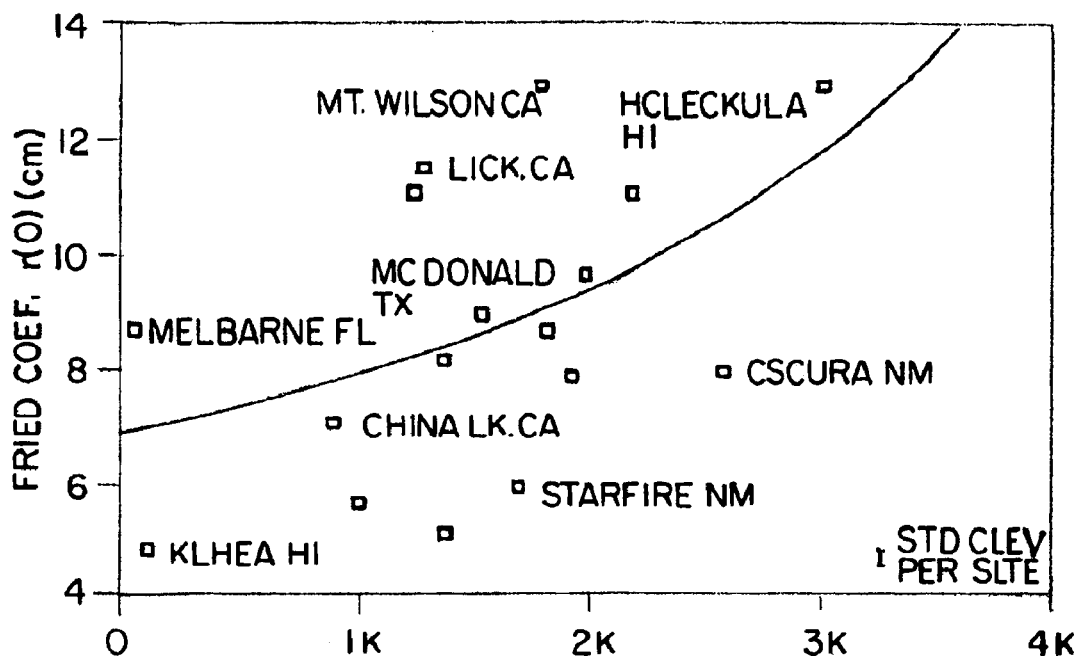
FIG.—12
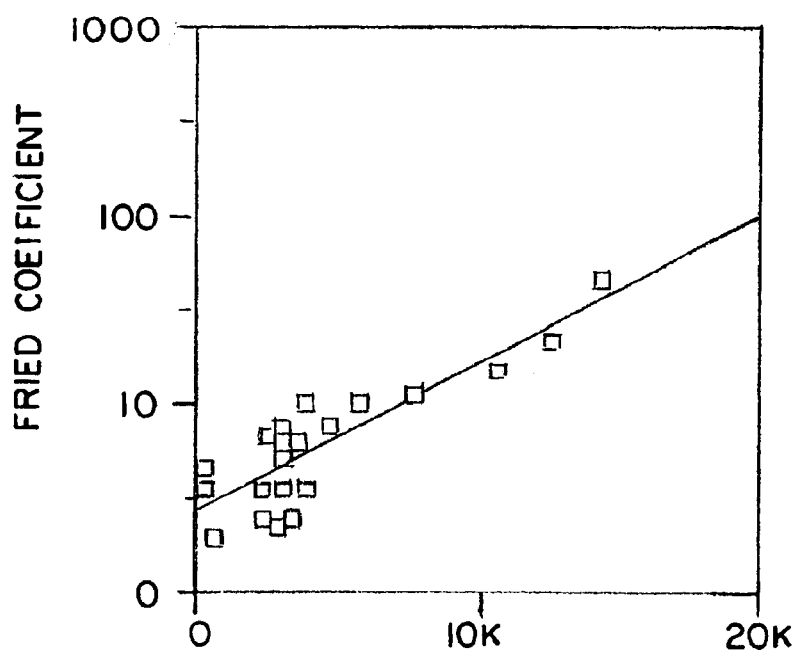
FIG.—13

TRANSFER OPTICS

This application claims a benefit of 60/403,800 filed on Aug. 15, 2002.

BACKGROUND OF THE INVENTION

When an incoming wavefront from a distant star reaches the earth's atmosphere it has a plain wavefront and accurate imaging of the star is possible, as evidenced by the remarkably sharp pictures from the exo-terrestrial Space Telescope. However as it passes through the atmosphere the wavefront encounters turbulent layers of air resulting from thermal differences in the atmospheric layers and the wavefront is distorted, as shown schematically in FIG. 1. The farther the light travels through the air and the denser the air is, the greater the amplitude of the distortion typically becomes and the closer together the peaks in the wavefront distortion become. This distortion can be corrected by reflecting the wavefront from a mirror surface which perfectly matches the distorted wavefront laterally but has half the amplitude of the wavefront distortion. The phase of the light depends on the wavelength, so the shorter the wavelength the greater the phase error and the more critical its correction becomes. However in the visible region of the spectrum as much as 96% of the turbulence-induced atmospheric distortion can be removed using adaptive optics. Sharp pictures can be obtained from the ground as well as from space, as seen in FIG. 2. Adaptive optics has clearly opened a new chapter in the field of astronomy.

A statistical measure involving the phase error is a coefficient $r_0$, often called the Fried (freed) coefficient after Professor Fried, the Professor at the Naval Postgraduate School in Monterey Calif. who first suggested it. As the Fried coefficient becomes smaller the distortion becomes greater. For zonal compensation involving actuators pushing against the flexible faceplate of mirror and affecting both displacement and local tip-tilt of the faceplate elements, the phase fitting error $\sigma_F^2$ of the adaptive optic mirror to the wavefront, is given as $$\sigma_F^2 \approx 35(r_g/r_0)^{5/3} \qquad (1)$$

where $r_g$ is the distance between actuators. If more actuators are used, for example let the actuator separation be decreased by a factor of 2, then the phase fitting error is decreased by a factor of about 3. Equation (1) implicitly assumes that the influence function of the faceplate, defined as the elementary deformation of the faceplate surface produced by one actuator, all other actuators acting only as springs, extends approximately to the next actuator. If the faceplate is not sufficiently flexible, so the influence function extends over many actuator separations, the mirror faceplate cannot distort to correct for peaks in the phase with spatial separations of the order of $r_0$ and Eq. (1) does not represent the situation. As $r_0$ becomes shorter the separation between actuators should not become significantly less than the faceplate influence function. If the faceplate is not sufficiently flexible, the fitting error can become unacceptably large.

The other important factor in adaptive optic operation is the time delay $\tau$ between the time the wavefront error is sensed and the time the actuator has moved to correct it. This time delay arises both from the sensing circuit $\tau_c$, and the time constant of the actuator $\tau_a$. The relationship between the mean squared phase error $\sigma_\tau$, and the delay time $\tau$ is again a 5/3 ds power dependence, and is given by $$\sigma_\tau^2 = (\tau/\tau_0)^{5/3} = 6.88(\tau v/r_o)^{5/3} \qquad (2)$$

where the Greenwood time delay $\tau_o$, the delay which results in a phase error of one radian, is given by $\tau_o = 0.314\, r_0/v$. Here v is the modulus of the average propagation velocity through a turbulence layer. Two delay times contribute to $\tau$, the time constant of the feedback control circuit $\tau_c$ and the time constant $\tau_a$, representing the response of the actuator itself in practice it is desirable that $\tau_c + \tau_a <$ one millisec.

DESCRIPTION OF THE PRIOR ART

The image quality through a large telescope degrades exponentially with the variance of the wavefront distortion. The intensity of the diffracted image of a point source may be represented by the Strehl function R, where $\sigma^2$ is the mean square deformation (equivalent to wavefront fitting error or error variance) of the incoming wavefront of wavelength $\lambda$. Then $$R = e^{31} (2\Pi/\lambda)^2 \sigma^2 \qquad (3)$$

The threshold goal for an aberrated image of point source relative to an aberration free point source image is often taken as a phase difference of one radian, since images with less than one radian of phase difference are relatively acceptable, whereas those with phase differences of more than one radian are undesirable. The Strehl ratio $R_{min}$ corresponding to the threshold phase difference is $R_{min} = 1/e = 0.37$. The contribution of adaptive optics to the value of R is determined by two transfer functions, the telescope transfer function, and the atmospheric transfer function. The telescope transfer function, which is a maximum when R=1 but which is said to be diffraction limited for image quality, according to the Rayleigh criterion, if R=0.80, is a function only of the diameter of the telescope entrance pupil relative to the wavelength. The atmospheric transform function represents the effect of the atmosphere on the image formed. It has two parts, one related to the aberrations introduced into the incoming, initially plane wave by the atmosphere and represented by $\sigma_F$, and one related to the time delay of the actuator and the control circuit and represented by $\sigma_\tau$ as discussed above.

There have been many measurements of the optical coherence length $r_0$ of incoming light from space and they often disagree significantly in value. Fortunately there is a group at the Naval Postgraduate School in Monterey which has specialized in experimental measurements of the Fried Coefficient at different astronomical sites for over 20 years. It is headed by Professor Donald Walters, who has achieved a reputation for reliable and consistent results over both a long period of time and under various experimental circumstances. His $r_0$ data is used in this analysis. It is illustrated in FIG. 12. It was all taken using a telescope with a 0.35 meter diameter primary mirror and is for starlight measured over some period within the time from just after sunset to just before dawn. A series of high altitude balloon measurements made at Lawrence Livermore National Laboratory are shown appended to the Walters et. al., data and are illustrated in FIG. 13. Agreement of the two sets of data in areas of altitude overlap is quite good.

The images were focused on a one dimensional array and exposure times were typically between ½ and 1 sec. Longer exposures increased susceptibility to wind and vibration induced image motion. Shorter exposures could suppress atmospheric low frequency tilt components and reduce signal to noise ratio. Eight of the locations measured had additional instrumentation including acoustic sounders, and microthermal probes either mounted on towers or carried aloft on meteorological balloons to obtain corroborating data. Measurements were made at about 750 nm just at the long wavelength edge of the visible spectrum. They were then scaled to give zenith values of $r_0$ at a wavelength of 500 nm. A comparison with data of sites plus balloon results from the U.S. Naval Observatory at Flagstaff, Ariz. showed excellent correlation up to coherence lengths of 20 cm or so. Most of the measurements were made at astronomical sites chosen with the expectation that the Fried coefficient would be longer than at average sites. A few of the sites were not potential astronomical sites and were chosen to investigate possible differences at "average" locations, particularly those near sea level. Some of these sites were surprisingly good.

A more detailed view of the terrestrial data is given in FIG. 12. There are considerable differences between the sites. One of the most striking is Mt. Wilson, which is in the mountains overlooking Los Angeles. Its mean covariance length is 12.9 cm, nearly 4 cm larger than the curve fit at that altitude. The standard deviation of all measurements made at Mt. Wilson is only 0.17 cm, far too small to explain the discrepancy. The average standard deviation for all measured sites during astronomical observing times is only 0.15 cm, as seen on lower right of the figure. Each site is remarkably consistent, and the differences between sites are clearly not just a matter of altitude.

It is important to remember that the reported data are not "average" data for locations at the various altitudes. Instead they are taken at some of the best sites available using optimum conditions. For example, no data are reported for periods just before climatic changes such as an advancing cold front. Test measurements made under approaching cold front conditions led to $r_o$ values in the 4–7 cm range at Mt. Wilson, which had average values under normal test conditions of 12.9 cm. Also no data were reported during the daytime when solar heating will lead to reduced $r_0$ values. Data taken uniformly during 24 hour periods during average conditions in average places would surely reduce the $r_0$ values to some extent. To provide good correction of atmospheric aberrations down to sea level the actuator separation should be no larger than the Fried coefficient, as seen from Eq. (1). FIG. 12 suggests that the faceplate actuator separation should thus be equal or less than 4 cm. On the basis of the incomplete data we have on "average conditions" for 24 hour operation, a choice of 2 cm might be more prudent if a sufficiently thin, flexible faceplate can be made.

Assuming that the atmospheric rather than the telescope transfer function is the limiting parameter, that the faceplate influence function is optimal, and that $\sigma_\tau \ll \sigma_F$, the Strehl ratio becomes mainly a function of the number of actuators for a mirror of diameter D at a wavelength $\lambda$. It may be written as $$R \sim e^{-(2\Pi/\lambda)^2(0.335 r_\theta r_c)^{5/3}} = e^{-(2\Pi/\lambda)^2(N_o N)^{5/6}} \quad (4)$$

Eq. (4) gives the theoretical Strehl ratio that should be observed as a function of the ratio of the actuator spacing to the Fried coefficient. The minimum number of actuators which theoretically should give acceptable performance and the improvement in performance to be expected by increasing the number of actuators can also be obtained from these equations, assuming that the mirror performance is limited by the atmosphere. Roddier has compared the theoretical predictions above to experimental results for a number of large adaptive optic mirrors. He finds good agreement, except that as the number of actuators increases their efficiency decreases.

It becomes increasingly difficult to obtain the optimum influence function with a glass faceplate as the number of actuators per unit area becomes large. Thin glass sheets are very apt to fracture. Nevertheless most if not all facesheets planned for adaptive optic mirrors at the present time appear to be made of glass. A cutting edge example is the adaptive secondary optic for the Multiple Mirror Telescope being developed by Media Lario and others in Italy. The glass facesheet is 64.2 cm in diameter and 1.6 mm thick. An even more difficult effort is the deformable mirror being made for the Multiple Mirror Telescope at the Stewart Observatory at the University of Arizona. Its faceplate is 51 cm in diameter and 0.4 mm thick. The 3000 actuators will be spaced at an interactuator distance of 0.8 cm. Calculations suggest that each actuator influence function may then extend to a radius of as much as 5 actuators.

The advantages of using the primary mirror as the adaptive optic mirror instead of the secondary mirror should be mentioned. The number of actuators needed for atmospheric correction is the same whether the primary or secondary is used. However the demagnification in size of area between the primary and the secondary is reflected in the additional crowding of the already closely spaced actuators. Performance will be best if the influence function of the faceplate is of the same order as the actuator. The thickness of the mirror faceplate for the primary mirror is already at the limit required to make this objective feasible. If the secondary is chosen as the adaptive optic element, it is not clear how the influence function size criteria can be met successfully for poor seeing days even at high altitude observatories.

A telescope with a primary mirror having a one meter diameter which could correct wavefront errors under conditions where $r_0$ is only 2–4 cm offers some interesting possibilities. They would increase the flexibility in planning observations at observatories since the need to wait for nights that have particularly good seeing would become largely unnecessary. In addition, observatories would become feasible at much lower altitudes. Even sea level observatories would be possible. Schools in the Midwest with physics and astronomy departments would no longer have to send their students to California or Arizona to do observing. They could do it from their own campus if light pollution were not a serious problem. Serious amateur astronomers might also be interested in obtaining an adaptive optic system for themselves, particularly since we anticipate that there would be a cost advantage compared to conventional telescopes.

It is not feasible to make much larger telescopes than we now have using monolithic mirror construction. There are exciting opportunities to use much larger telescopes than we now have. The light gathering power of a telescope goes up as the square of its diameter and its resolving power, if not limited by the atmosphere or the phasing of mirror segments that would be necessary to make up a very large telescope, goes up as the primary mirror diameter. With low scatter optics problems such as seeing the details of distant galaxies or attempting direct observation of planets around nearby stars becomes feasible. In such applications the ~1 meter segments would probably be hexagonal and have long throw actuators to handle tip-tilt of the segments. The thousands of short throw, inexpensive actuators for atmospheric correction would only be called upon to handle that, not the tip-tilt of the segments themselves.

SUMMARY OF THE INVENTION

Based on the above discussion certain desirable features are suggested in the design of a zonal type adaptive optic mirror. If planned for use at low altitudes, the mirror should have actuators separated by 2–4 cm and a faceplate with an influence function of a similar length. The actuators should have a response time of the order of one millisec. The diameter of the adaptive optic mirror, if it is to be used either by itself or in a segmented very large mirror such as CELT, will be at least one meter in diameter. It is difficult to make glass faceplates thin enough to meet such conditions and not have them fracture. In order to have an adequate actuator influence function the faceplate thickness should be about 0.2 to 0.8 mm thick. A cyanate ester composite mirror is fracture resistant and can be made and installed in such an application.

It is also difficult to use conventional types of actuators in such applications. Actuators depending on the linear expansion of piezoelectric elements can exert a large force, but they have limited throw per element and multiple elements required make them rather expensive. Many have a long time constant, so they cannot keep up with atmospheric changes very well. A different choice in actuator design can correct these limitations.

Graphite fiber reinforced cyanate ester has about the same very low expansion coefficient as Zerodur or ULE. By processing the surface properly a 20–50 µm layer of pure resin can be formed on the surface which is not penetrated by roughness-inducing graphite fibers. By replicating a thin sheet of the cyanate material on a superpolished mandrel a surface can be generated which is very smooth, 5–10 A rms, and produces a mirror surface which scatters as little as one tenth the light scattered by conventional astronomical optics. We also expect to demonstrate that in adaptive optic applications they can have a good overall optical figure.

These cyanate mirrors are called "Transfer Optics" to distinguish them from the lower quality but much better known "Replica Optics" the Optics Community is familiar with. It is an object of this invention to combine cyanate ester technology together with some very compact, inexpensive, piezoelectric actuators to produce adaptive optic mirrors meeting the goals outlined above. It appears that by using this approach adaptive optic mirrors in diameters up to 1 to 2 meters can be made both achievable and affordable. They will be useable even at sea level to remove a large fraction of the distortion introduced by the atmosphere and should reduce time lost even at high altitude observatories when bad seeing days occur. The will make daytime observations feasible.

Commercially available materials such as Zerodur and ULE are not viable for mirror surfaces unless relatively large influence functions are acceptable.

BRIEF DESCRIPTION OF THE DRAWINGS

FIG. 7—Supersmooth composite mirror.

FIG. 8—Side view showing spherical shape of faceplate is uniform in curvature.

FIG. 9—Circular fringe pattern indicates long radius spherical faceplate.

FIG. 10—Straight line fringes from ¾ cm diameter spot size shows lack of structure so small microroughness.

FIG. 11—Microroughness at center of mirror is only 0.8 nm showing faceplate is superpolished.

FIG. 12—Scatter of Fried coefficient at level trial sites. The variance per site indicated at lower right. There is a significant decrease in Fried coefficient with decreasing altitude but the value at a given site is clearly site specific.

FIG. 13—Graph of Fried coefficient over a range of sites plus balloon results.

DETAILED DESCRIPTION OF THE PREFERRED EMBODIMENTS

Figure 1:
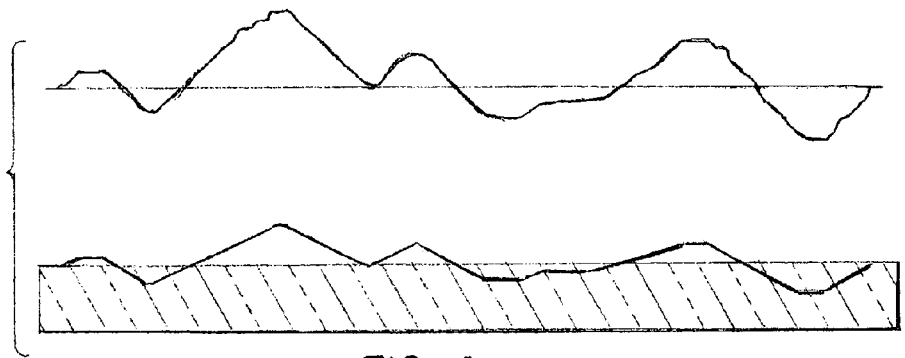
FIG. 1—Principle of adaptive optics. Disturbed wavefront reflects from a matching mirror, giving plane wavefront.
Figure 2A:
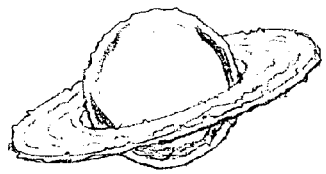
FIG. 2—Example of resolution being increased dramatically through use of adaptive optics.
Figure 2B:
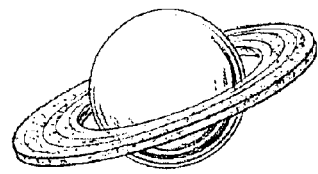
Figure 3:
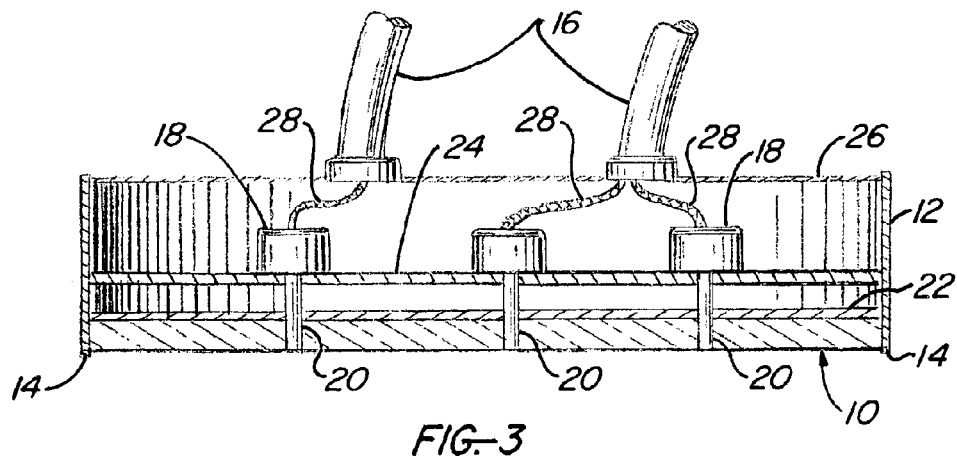
FIG. 3—Cross sectional view of present invention.

FIG. 3 shows a cross sectional view of the present invention. Mirror surface 10 is made of a graphite filled cyanate ester composite. These cyanate ester composites are known for their extremely low expansion coefficients, about $5 \times 10^{-8}$. It is comparable to Zerodur and ULE, the lowest expansion materials known. However, it has been considered a failed technology for mirrors because unless properly cured, graphite fibers extend through the surface of the mirror causing major scatter problems. It has been determined experimentally this problem has been cured. Glass is used nearly universally for an adaptive optic, AO, faceplate material and works well as long as it can be over a few millimeter, mm, thick. However at low altitude the flexibility requirements needed to correct the wavefront make the glass very thin and it fractures. For use at low altitudes adaptive optics material that can be thinner than glass is thus greatly desired. Cyanate ester provides a very thin mirror with thickness in the 0.2 mm to 0.8 mm range that does not fracture. Mounted cyanate ester mirror faceplate 10 in FIG. 3 is supported by support 12 which is made of cyanate ester as well. Support 12 also serves as an actuator housing canister. Support 12 must have the same coefficient of thermal expansion as mirror 10. If it does not, mirror 10 will distort in unpredictable ways as the ambient temperature changes. Sealant 14 is used to hold mirror 10 to support 12. Any commercially available sealant for cyanate ester bonding may be used, such as those available from Composite Mirror Applications, Inc. Electrical interfaces 16 such as ribbon cable provide connectors to a master control, not shown, for each actuator. The master control such as a computer, permits any pattern of change to the mirror surface desired.

Since the influence function goes as the cube of the thickness, the thinness of mirror 10 allows actuators 18 to change the shape of the surface of mirror 10 over smaller areas. Actuators 18 may be standard piezoelectric stacks well known in the art. Actuators 18 may be glued to the backside of mirror 10 via push-pull rods 20. To assure push-pull rods 20 don't buckle a guide plate 22 may be installed to add support. Guide plate 22 has a plurality of openings for push-pull rods 22 to pass through. Guide plate 22 must have the same coefficient of thermal expansion as mirror 10 and support 12 or thermal distortion may occur. Actuators 18 are mounted to mounting plate 24 which must also have the same coefficient of thermal expansion. A rear cover plate 26 may be added for further support if desired. Again it must have a matching coefficient of thermal expansion. Rear cover plate 26 may also serve as a mounting for electrical interface 16 to help guide individual electrical leads 28 to each actuator 18.

The shape of mirror 10 and support 12 are shown as cylindrical but the shape may be modified as desired.

Prior adaptive optics have used glass. Thin glass with reduced influence function is limited to small mirrors. Large sheets of thin glass break easily. This invention permits larger mirrors 1 meter or more to be made with short influence functions. By using cyanate ester instead of glass, large mirror adaptive optic surfaces can be made that are smooth with low scatter and short influence functions.

The low scatter aspect of this mirror surface results from the manner in which the cyanate ester is formed into a mirror. The method is to prepare a high quality optical flat which is also known as a superpolished glass mandrel. This can be made of glass with a conventional thickness to diameter ratio of 1:6. The cyanate ester sheet is laid over the flat and caused to harden via standard techniques. The surface against the optical flat acquires the same smoothness as the optical flat. Once hardened it is removed from the optical flat with a superpolished mirror finish on one side and with an rms roughness of less than 1 nanometer and without graphite fiber scattering problems.

Young's Modulus for silica-based glasses is about $10.4 \times 10_6$ psi. A glass microscope slide 1.65 mm thick, 20 mm wide and 63 mm long was clamped on one end and weights were placed on the other end so that the distance between the clamp and weight was 5.5 cm. A Federal model 432 millionths indicator was used beneath the weight to measure the deflection and determine Young's Modulus using the equation $$y=-(4F/Eb)(L/d)^3 \qquad (5)$$

where y is the deflection, F the force, b the width, d its thickness, L the effective length and E Young's Modulus. A series of measurements were made for different end masses and a straight line was obtained when the deflection was plotted against the weight. A composite graphite impregnated cyanate ester copy of the glass slide was made and the measurements repeated. Young's Modulus was measured to be $13.4 \times 10^6$ psi, slightly more than the glass. Moreover, the cyanate ester composite does not fracture as glass does and is extremely tough. It can be produced in large sheets in thin layers with thicknesses as low as 0.2–0.3 mm by replication. There are complications when the number of plies used for very thin layers is small. An individual layer is not laterally homogeneous. Also areas of the mirror will differ in thickness. As a result surface defects and warping can occur. Slightly thicker faceplates measuring about 2.0 mm in thickness or more require less care to produce.

Ongoing research is attacking the problem. By casting facesheets on a superpolished glass mandrel one can have 0.8 mm thick facesheets under 10 A rms in microroughness. It is anticipated that number can be reduced to ~5 A rms. Since the level of light scattered from an optical surface increases as the square of the roughness, a 5 to 6 A rms surface would scatter about ten times less than a conventionally polished astronomical mirror. From Eq (5) the deflection of the plate decreases as the cube of its thickness. For interactuator distances of 4 cm the faceplates should be about 0.8 mm (millimeter) thick and for 2 cm distances about 0.6 mm thick. The first prototype mirror made was 23 cm (centimeter) in diameter. It had an 0.8 mm faceplate, as does the second, which has a diameter of 30.5 cm.

Some of the other characteristics of this composites materiel are (1) expansion coefficients comparable to those of Zerodur and ULE, the lowest expansion coefficient materials known. Values of 0.05 ppm/°K have been reported for the graphite filled composite. The material has a low thermal conductivity. It cannot be used above its glass transition temperature, 200–260° C. Its density is low, 1.61 g/cm³. It is only 73% that of ULE (ultralow expansion quartz, which is 2.20 g/cm³) and 64% that of Zerodur (which is 2.53 g/cm³). Areal densities of 3.2 kg/m², one of the lowest values yet achieved for precision mirrors, has been achieved using these composite mirrors.

Figure 4:
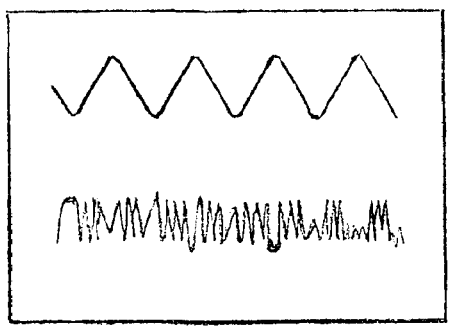
FIG. 4—Top—triangular voltage wave applied to actuators. Bottom—interferometer trace, which shows no hysteresis.

A question arises on how the piezoelectric actuator performance can be measured when the actuators are assembled in the mirror. One technique is to use a non-contact Michelson interferometer. A double-trace oscilloscope tracks the interference fringes on the lower trace, which is in phase with the upper trace which shows the drive voltage. This technique is a sensitive method for detecting both the displacement amplitude and the phase lag if any. The fringes in FIG. 4 were taken on a prototype mirror, which was 23 cm in diameter. Instead of stacked place actuators the actuator used was a flat plate piezoelectric edge supported. The flexure of the faceplate provided the desired displacement. The response time of this type of actuator was significantly less than a millisec. The faceplate was 1.6 mm in thickness and the wavelength 0.6328 μm. Two fringes are equal to one wavelength of displacement. The fringes were recorded on a digital camera. For low displacements, a few wavelengths of light, there was no hysteresis. As the displacement became larger and the voltage increases to 100 V peak to peak, hysteresis begins to appear. When displacement approaches 5 μm (micrometers) the hysteresis becomes as large as 16%. As the frequency becomes even higher but the displacement drops, the hysteresis again disappears.

Figure 5:
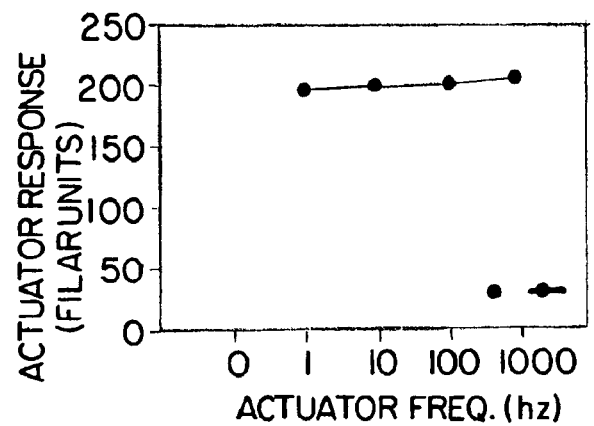
FIG. 5—Graph of actuator response to applied frequency.

The displacement of actuators 18 depends on the voltage applied and on the force required to displace the membrane, mirror 10. If the mirror is tilted while tracking, the load on the actuators will change. To compensate the actuators should be calibrated at all positions. Any actuator that lifts a 2 kg weight is adequate to use. The stiffer and thicker the membrane, mirror 10, the longer the influence function and the more force is required per μm, micrometer, of faceplate travel. Tests made on the unloaded actuators showed the displacement was linear with applied voltage up to a voltage of 250 V. The displacement was 175 μm at that point. It increased more slowly with increasing voltage after that. The response of the actuators was linear but virtually independent of frequency. It rose about 4% in going from a frequency of 1 hz to a frequency of 1 kHz, as seen in FIG. 5. A Filar Unit is defined as minimum separation between graduations in a Filar microscope. Such microscopes are used for very accurate linear measurements.

Figure 6:
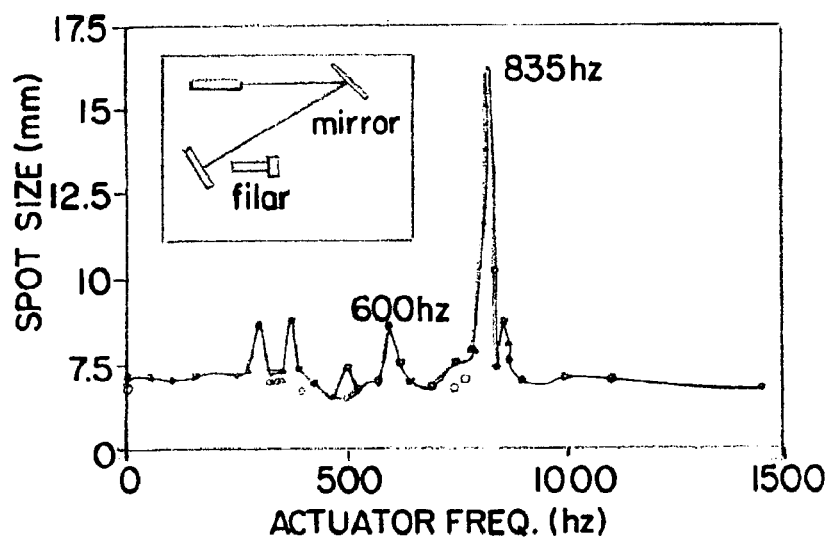
FIG. 6—Graph of second harmonic resonance of mirror faceplate.

Resonances in the faceplate can also occur for key frequencies, as seen in FIG. 6. This data was taken on a glass prototype mirror. The thickness of this faceplate was one mm. The theoretical resonant frequency of a mirror is $$v = \frac{10.21h}{2\pi r^2} \sqrt{\frac{E}{12\rho(1-\sigma^2)}} \qquad (6)$$

where h is the faceplate thickness, r the distance to the nearest clamped point (i.e. actuator), E is Young's Modulus, ρ the mass density of the faceplate, and σ Poisson's ratio. The calculated fundamental frequency for this glass faceplate is 1.88 kHz, so the observed resonance should be a second harmonic. The resonance for a composite should be similar except that the density of the composite is only 1.61, only 73% that of glass and Young's Modulus is $1.34 \times 10^6$ psi, 1.29% higher than glass. Both these factors will tend to push up the resonance to higher frequencies for the composite. If it goes up to ≧1 kHz, the resonance problem can largely be neglected.

As an example, a 0.3 meter diameter (12") composite mirror was fabricated and is seen in FIG. 7. Significant distortion is visible near the mirror edges. It could be removed, to first order, by a static mechanical actuator adjustment and to second order if necessary by more elaborate active optics adjustments. The overall spherical shape of the faceplate 10 is seen by comparing the mirror faceplate with the straight edge 30 in FIG. 8. The graph 32 in the top part of FIG. 8 shows the displacement in millimeters as you travel across any diagonal. The center shows a flat spot. The radius of faceplate 10 can also be deduced from interferometric measurements made over small areas of the mirror. When the spot size diameter is 3 cm, nearly circular rings are obtained near the center of the mirror, as seen in FIG. 9. Over a very small area, a ¾ cm diameter spot size, straight fringes are obtained, as seen in FIG. 7. The lack of structure on these fringes suggests that the surface is very smooth, a result confirmed by the Wyko Interferometer measurements discussed later. There is slight astigmatism; there are 10 and 11 fringes going up and down vertically along the semi-major axis and 18 fringes in both directions along the semi-minor axis. Using the Saggital formula, $R=L^2/2s$ where R is the radius of the spherical surface, L the radius of the spot examined, and s is the Sagittal depth of the surface over diameter 2L, the radius of the sphere can be calculated. Averaging their number and remembering that there are two fringes per wavelength, the average radius of curvature of the quasi-spherical faceplate is 25 meters. The average radius over the entire mirror, obtained from FIG. 8, is 12.7 meters, showing the center of the mirror is slightly flattened. The spherical shape may be related to the difference in expansion coefficient of the graphite impregnated ester and the Pyrex flat used as a mandrel. Pyrex has an expansion coefficient of 3.2 ppm/° C. and the graphite impregnated cyanate ester has an expansion coefficient of 0.05 ppm/° C. This nearly two order of magnitude difference in expansion coefficient may be responsible for the spherical shape of the faceplate. Warping has been observed for cyanate ester faceplates cast on very fast glass mandrels. In that case it may be successfully removed by adjusting the mirror support. A slower or lower temperature curing cycle or a better match in the two expansion coefficients are other possibilities. However, when a second faceplate was cast on a Zerodur mandrel, which has an expansion coefficient similar to the composite material the resulting faceplate was flat and the problem was corrected.

Using conventional fresh-feed polishing techniques, glass surfaces, including telescope mirrors, are expected to have surface roughnesses of 20–25 Å rms. Since the scattered light level is proportional to the square of the rms roughness, a 2.5 nm rms mirror will scatter nearly ten times as much light as a 0.8 nm surface. The ability of a telescope to resolve a weak source in the neighborhood of a strong source depends heavily on the amount of scattered light generated by the optical surfaces in the telescope. In considering whether a graphite impregnated composite cyanate ester faceplate will make a good telescope mirror material, the scattering level achieved is important. A small 5 cm diameter coupon of this composite material was previously measured and had a microroughness of between 0.6 and 0.8 nm rms. It is asserted that this is the lowest microroughness achieved to date using fiber-reinforced composite materials. The question remains as to whether in a normal production process such a low roughness can be expected. It clearly depends critically on the smoothness of the mandrel used to cast the ester material on. Three 30 cm Pyrex blanks were superpolished to be used in this test. They were tested against each other and the optical figure tested out at about 0.1 wave in the visible. One of them was used to form the faceplate being discussed. Pyrex was used, in part, to see if under production conditions the difference in expansion coefficient affects the rms roughness. It clearly does not.

FIG. 11 shows the result of a Wyco Interferometer analysis of the transfer optic itself. The range of correlation lengths extended from one wavelength to 241 μm, somewhat longer than the usual 100 μm upper limit. The wavelength was 651.6 nm (nanometers) and the roughness value obtained was 0.82 nm, well within the superpolishing range. Three highly localized asperities were removed in the analysis and are shown by the black circles. They are clearly not endemic to the surface and may have been dust particles.

What is claimed is:

1. A transfer optical surface of graphite filled cyanate ester composite comprising:
   A. A mirror made of said graphite filled cyanate ester composite of preselected thickness and shape with a reflecting surface and a back surface, said mirror having a preselected coefficient of expansion;
   B. a support made of material with the same coefficient of expansion as said mirror for holding said mirror;
   C. a sealant placed to hold said mirror in said support such that it forms a bond between said mirror and said support;
   D. a plurality of push-pull rods mounted to said mirror back surface in a predetermined pattern;
   E. a plurality of actuators, one operably connected to each of said plurality of push-pull rods;
   F. a master control connected to all of said actuators so they may be individually activated independent of the remaining actuators; and
   G. an actuator mounting plate made of material with the same preselected coefficient of expansion for supporting said plurality of actuators.

2. A transfer optical surface as described in claim 1 further comprises a guide surface of material with said preselected coefficient of expansion placed between said mounting plate and said back surface of said mirror such that each of said push-pull rods may move through said guide surface independently of all other push pull rods.

3. A transfer optical surface as described in claim 2 where said actuators comprise piezoelectric actuators.

4. A transfer optical surface as described in claim 1 where said actuators comprise piezoelectric actuators.

* * * * *